United States Patent
Lau

(10) Patent No.: US 9,529,530 B2
(45) Date of Patent: Dec. 27, 2016

(54) ELECTRONIC DEVICE AND GESTURE INPUT METHOD OF ITEM SELECTION

(71) Applicant: Edward Lau, Markham (CA)

(72) Inventor: Edward Lau, Markham (CA)

( * ) Notice: Subject to any disclaimer, the term of this patent is extended or adjusted under 35 U.S.C. 154(b) by 267 days.

(21) Appl. No.: 14/458,891

(22) Filed: Aug. 13, 2014

(65) Prior Publication Data

US 2016/0048325 A1    Feb. 18, 2016

Related U.S. Application Data

(60) Provisional application No. 61/866,936, filed on Aug. 16, 2013.

(51) Int. Cl.
G06F 3/033 (2013.01)
G06F 3/0488 (2013.01)

(52) U.S. Cl.
CPC ....... *G06F 3/04886* (2013.01); *G06F 3/04883* (2013.01)

(58) Field of Classification Search
USPC ............... 715/863, 773, 810, 834, 220, 764, 823,715/835, 841, 716, 700, 771, 728, 829, 833,715/786; 345/173, 168; 348/113
See application file for complete search history.

(56) References Cited

U.S. PATENT DOCUMENTS

| | | | |
|---|---|---|---|
| 2011/0193787 A1* | 8/2011 | Morishige | G06F 3/016 345/173 |
| 2011/0302532 A1* | 12/2011 | Missig | G06F 3/0416 715/823 |
| 2012/0098743 A1* | 4/2012 | Lai | G06F 3/0236 345/157 |
| 2013/0024820 A1* | 1/2013 | Kirkpatrick | G06F 3/04883 715/863 |
| 2014/0267046 A1* | 9/2014 | Ellsworth | G06F 3/04886 345/168 |
| 2014/0372856 A1* | 12/2014 | Radakovitz | G06F 3/04883 715/220 |

* cited by examiner

*Primary Examiner* — Doon Chow
*Assistant Examiner* — Wendy Nicholas

(57) ABSTRACT

An electronic device utilizes gesture input method of item selection to perform various input actions. An item of a plurality of items may represent, for example and without limitation, a character, a symbol, or an icon. One or more input sensors of the electronic device capture gesture navigation input and an item selection routine converts the input into a standard, magnitude independent pointer, and then determines the corresponding item. Since the selection is not determined by the exact direction and magnitude of the gesture input, selection accuracy can be greatly enhanced. By employing the item selection routine and standard pointers, item selection traverse paths can be cycled within a confined sensing region, thus selection speed can be improved and device size can be reduced. By memorizing the traverse paths, user can select a desired item without looking at the display, thereby being accessible to visually impaired users.

6 Claims, 10 Drawing Sheets

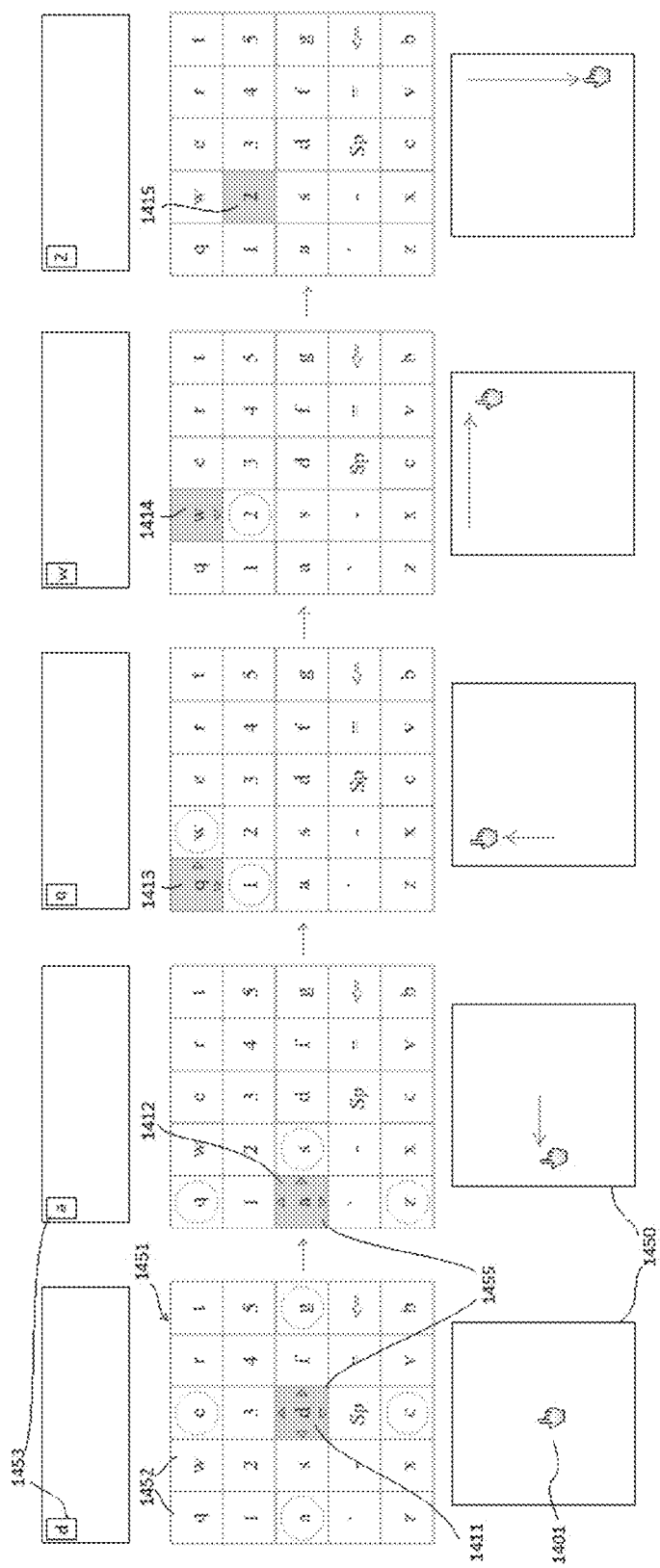

ELECTRONIC DEVICE AND GESTURE INPUT METHOD OF ITEM SELECTION

CROSS-REFERENCE TO RELATED APPLICATIONS

This application claims the benefit of U.S. Provisional Application No. 61/866,936, filed on Aug. 16, 2013, which application is incorporated herein by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND

1. Field

The disclosed and claimed concept relates to computer techniques, specifically to electronic device and gesture input method of item selection.

2. Description of Related Art

Conventional input apparatus of electronic devices use physical keyboard or touch-screen keyboard for typing. The keyboard size is limited by the size of the devices. If the keyboard size is small, users may have difficulty in selecting a desired key. Users must constantly look at the keyboard in order to select the desired key. For new types of smart devices, such as Smart Watch and Smart Glass, the typing feature may not even be available due to its size and physical limitations.

BRIEF DESCRIPTION OF THE DRAWINGS

A full understanding of the disclosed and claimed concept can be obtained from the following description, read in conjunction with the accompanying drawings:

FIG. 9 depicts an embodiment of selecting an item from a plurality of items where the items are arranged in two-dimensional array.

DETAILED DESCRIPTION

Figure 1:
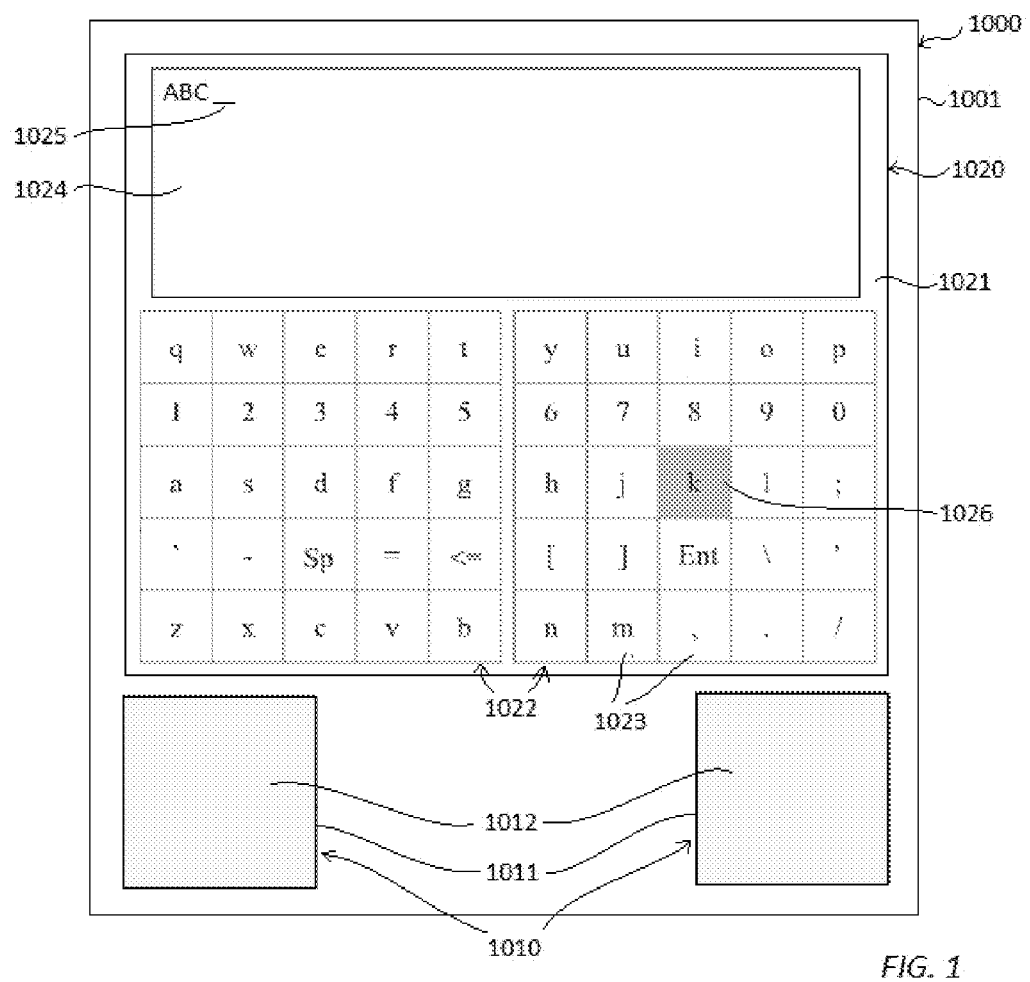
FIG. 1 is a front elevational view of an embodiment of electronic device that utilizes gesture input method of item selection to perform various input actions.
Figure 2:
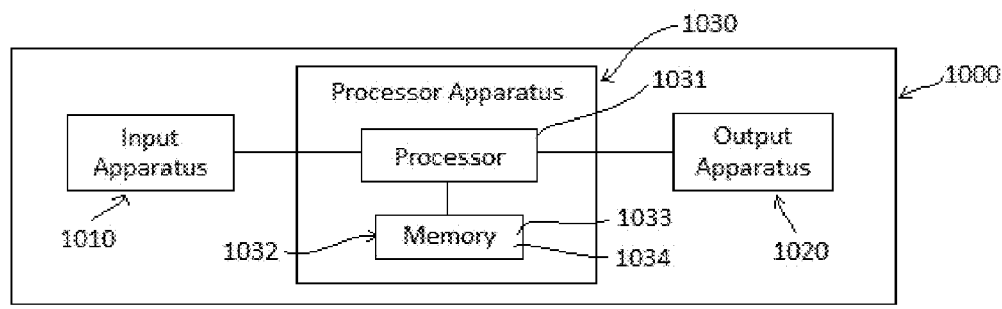
FIG. 2 is a schematic depiction of the electronic device of FIG. 1.

An electronic device 1000 in accordance with the disclosed and claimed concept is indicated generally in FIG. 1 and is depicted schematically in FIG. 2. The electronic device 1000 comprises a housing 1001 upon which are disposed an input apparatus 1010, an output apparatus 1020, and a processor apparatus 1030. The input apparatus 1010 provides input to the processor apparatus 1030. The processor apparatus 1030 provides output signals to the output apparatus 1020.

As shown in FIG. 2, the processor apparatus 1030 comprises a processor 1031 and a memory 1032. The processor 1031 may be, for example and without limitation, a microprocessor that interfaces with the memory 1032. The memory 1032 can be any one or more of a variety of types of internal and/or external storage media such as, and without limitation, RAM, ROM, EPROM(s), EEPROM(s), FLASH, and the like, that provides a storage register for data storage such as in the fashion of a machine readable medium or an internal storage area of a computer, and can be volatile memory or nonvolatile memory. The memory 1032 has stored an item selection routine 1033 that are executable on the processor 1031. The memory 1032 has further stored an "Occupied Item" log 1034 that records data of items that has been occupied.

With reference to FIG. 1, gesture input devices 1011 uses tactile and/or motion sensor to capture gestural signals. A sensing region 1012 is a specific boundary area where the gesture input device 1011 only captures the key gesture signals that are obtained within that confined area. The gesture input device 1011 can capture the gesture signal from one or more sensing regions 1012, then transfer the navigational, selection, and other input data to the processor apparatus 1030. The input apparatus 1010 can comprise one or more gesture input devices 1011. The exemplary embodiment of the electronic device depicted in FIG. 1 comprises two gesture input devices 1011; each gesture input device 1011 has one sensing region 1012 to capture the gesture signal from, for example and without limitation, user fingers, respectively.

With reference to FIG. 1, the input apparatus 1010 can have one or more gesture input devices 1011. Each gesture input device 1011 can have one or more sensing regions 1012. Thus, the input apparatus 1010 can have one or more sensing regions 1012 to receive gesture input. If the input apparatus 1010 has only one sensing region 1012, for example and without limitation, user can provide a gesture navigation input by dragging a finger on the sensing region 1012; to confirm the selection, simply hold the finger on the sensing region 1012 over a predetermined second. If the input apparatus 1010 has two or more sensing regions, for example and without limitation, the user can provide a gesture navigation input by dragging a finger on a sensing region 1012; to confirm the selection, simply tap another finger on another sensing region 1012, alternatively. The one sensing region configuration allows the user to use one hand to perform the item selection task. The two or more sensing region configuration allows the user to use two hands to perform the item selection task, thus it can increase the selection speed.

Figure 3A:
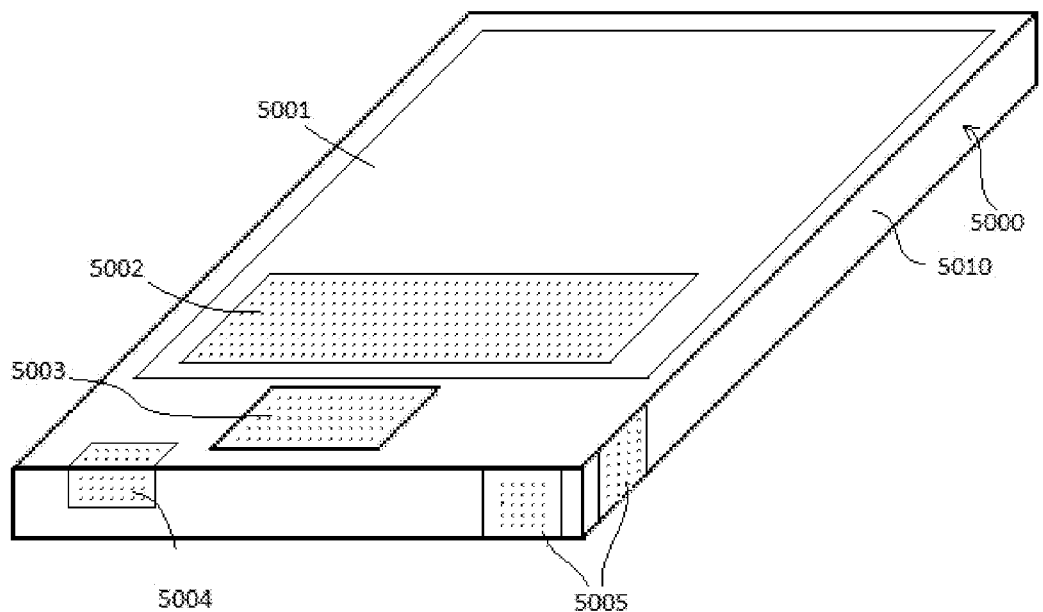
FIG. 3A is a front isometric view of another embodiment of the electronic device.
Figure 3B:
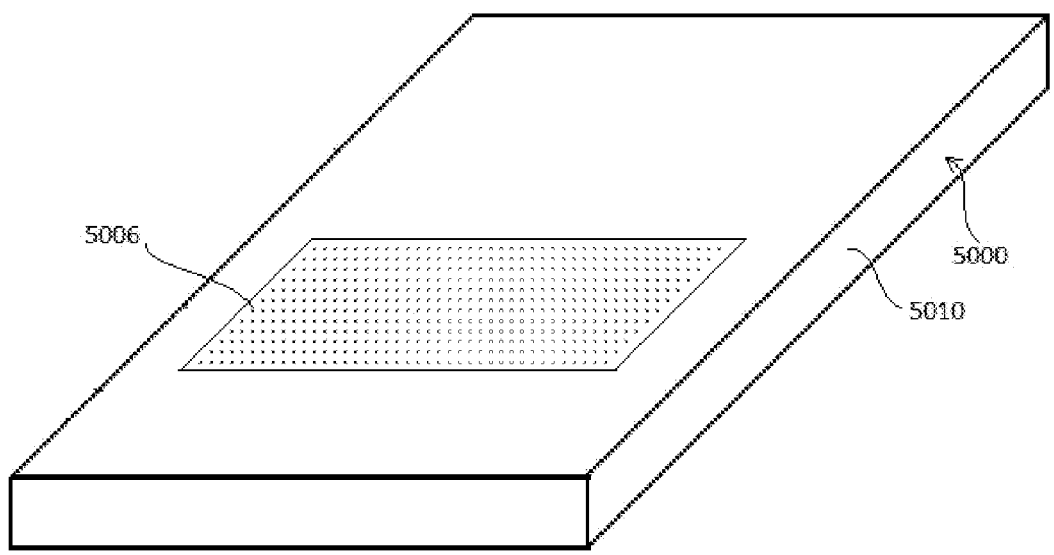
FIG. 3B is a back isometric view of the electronic device of FIG. 3A.

FIG. 3A, and FIG. 3B show another embodiment of the electronic device 5000 that depicts the possible position of gesture input devices and sensing regions. The electronic device 5000 can have one or more gesture input devices and sensing regions, and the gesture input devices and the sensing regions can be located, for example and without limitation, on top 5002 of a output screen 5001, on top 5003 of a housing 5010, on edge 5004 of the housing 5010, on side 5005 of the housing 5010, and/or on back 5006 of the housing 5010.

With reference to FIG. 1, the output apparatus 1020 of the first embodiment of the electronic device 1000 includes a display 1021 that provides visual output. The display 1021 comprises a plurality of items 1022, and a text area 1024. An item 1023 of the plurality of items 1022 may represent, for example and without limitation, a character, a symbol, or an icon that triggers the processor to execute a corresponding routine. Currently selected item can be indicated by, for example and without limitation, changing the content of a cursor 1025 and/or having an indicator 1026 highlighting the currently selected item.

Figure 4:
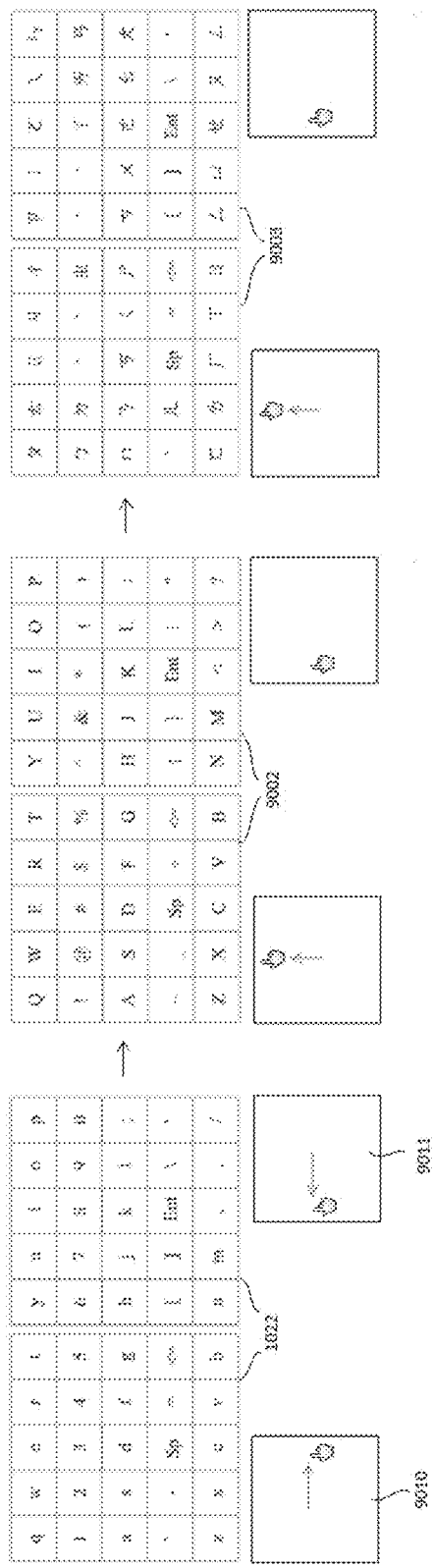
FIG. 4 depicts the electronic device of FIG. 1 in menu mode.

With reference to FIG. 1 and FIG. 2, the display 1021 of the first embodiment of the electronic device 1000 can show more than the plurality of items 1022. By activating a menu mode, for example, a user can instruct the processor 1031 to replace the plurality of items 1022 with another plurality of item[s] and display the new plurality of item[s] on the same display 1021. As depicted in FIG. 4, the menu mode is activated by, for example and without limitation, dragging a right finger to the right on a sensing region 9010 and dragging a left finger to the left on another sensing region 9011 simultaneously. The user can instruct the processor 1031 to change the plurality of items 1022 to another plurality of items 9002 by dragging the left finger upward on the left sensing region 9010 while holding the right finger on the right sensing region 9011. The user can again, instruct the processor 1031 change to another plurality of item[s] 9003 by dragging the left finger upward on the left sensing region 9010 again while holding the right finger on the right sensing region 9011.

Examples of other input members not expressly depicted herein would include, for instance, a mouse, joystick, soft buttons of a graphical user interface (GUI), hard buttons disposed on a case of the electronic device 1000, and so on. Examples of other output devices would include an audio speaker, LEDs or other light-producing components, and so on.

In accordance with the disclosed and claimed concept, when processor 1031 of the first embodiment of the electronic device 1000 receives gesture navigation input from the gesture input device 1011, the processor 1031 interprets the gesture navigation input as vertical and horizontal movement, respectively. If one of the vertical and horizontal movements has a magnitude greater [than] the other, and the magnitude is greater than a predetermined threshold, the movement having the greater magnitude would be employed by the processor 1031 and classified as a vertical standard pointer, horizontal standard pointer, or diagonal standard pointer.

Figure 5A:
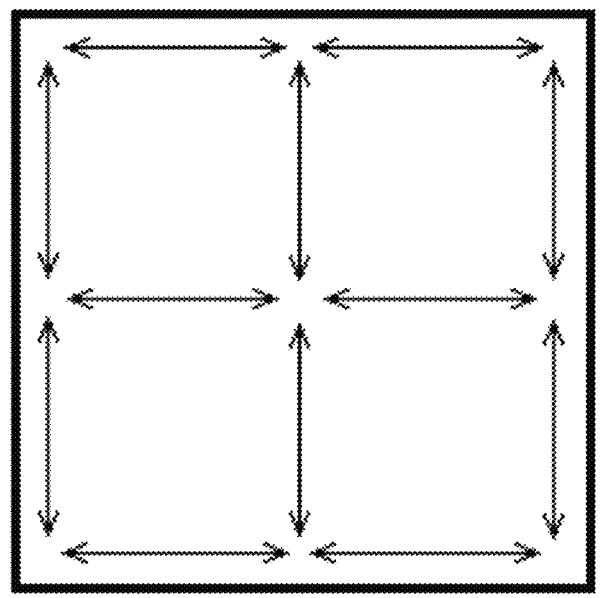
FIG. 5A shows an embodiment of an input apparatus and its traverse path for selecting an item from a plurality of items.

An exemplary embodiment of the gesture input device is shown in FIG. 5A. The standard pointers with respect to the sensing region of this gesture input device consists of vertical pointers, and horizontal pointers. As shown in FIG. 5A, traverse paths for selecting item from a plurality of items consists of those two types of pointers and the traverse paths are confined inside the sensing region 1012.

Figure 5B:
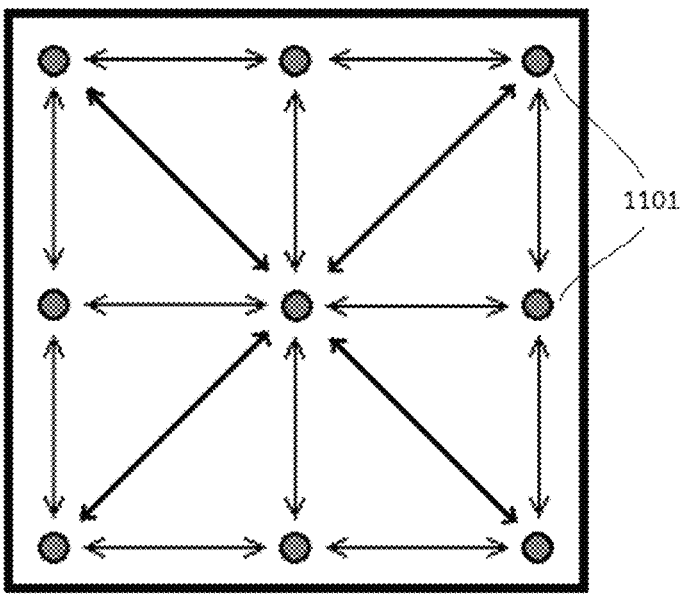
FIG. 5B shows another embodiment of an input apparatus and its traverse path for selecting an item from a plurality of items.

Another exemplary embodiment of the gesture input device is shown in FIG. 5B. The standard pointers with respect to the sensing region of this gesture input device consists of vertical pointers, horizontal pointers, and diagonal pointers. As shown in FIG. 5B, traverse paths for selecting item from a plurality of items consists of those three types of pointers and the traverse paths are confined inside the sensing region 1012.

With reference to FIG. 5B, the second embodiment of the gesture input device use[s], for example and without limitation, nine key sensors to the sensing region to capture gesture signal. Four key sensors are placed at four respective corners of the sensing region; four key sensors are placed in the middle of four respective edges of the sensing region; and one sensor is placed in the center of the sensing region. The key sensor, for example and without limitation, can have a raised contact surface to assist users to identify its location. The raised contact surface can even enable visually impaired users to use the second embodiment of the gesture input device to input data. When a key gesture signal moves from one key sensor to another key sensor, the gesture navigation input data is transferred to a processor. Since the gesture navigation input is already a standard confined movement with respect to the sensing region, the processor can directly convert the gesture navigation input into one of the standard pointers. Since the second embodiment of the gesture input device has an extra diagonal pointer; When a plurality of items are arranged in a two-dimensional array, the number of traverses for selecting an item can be reduced.

With reference to the first embodiment of the electronic device shown in FIG. 1 and FIG. 2, the item selection routine 1033 uses pointer input to select an item from a plurality of items; as long as the magnitude of the gesture navigation movement is greater than a predetermined threshold, the actual magnitude does not affect the item selection, thus enhancing the accuracy of item selection. Once the processor 1031 has converted the gesture navigation input into a standard pointer input, the processor 1031 then executes the item selection routine 1033 to assign an item from the plurality of item[s] 1022 as a temporary selected item. The assignment criteria comprise the standard pointer input and the history of previously assigned items.

Figure 6:
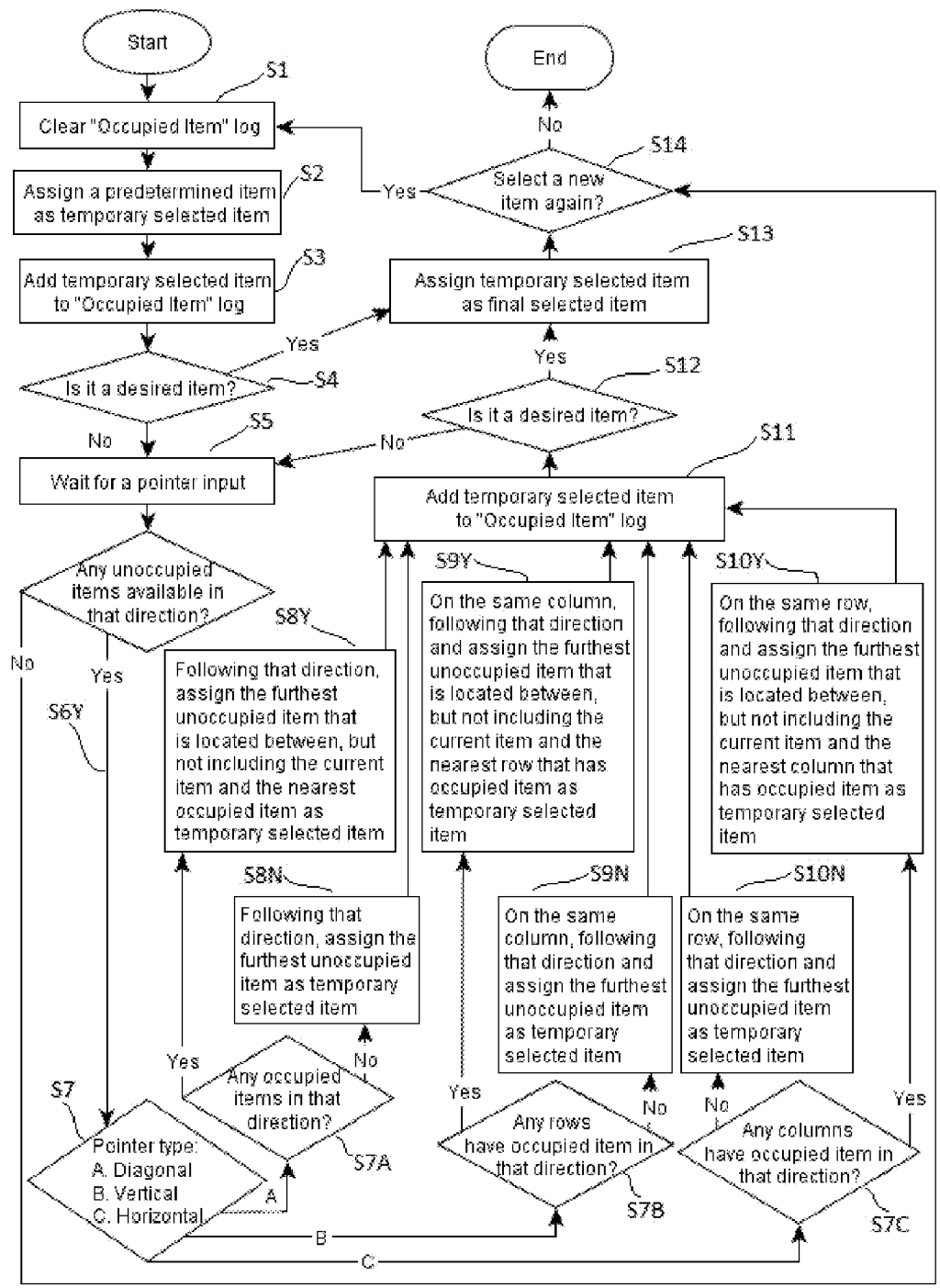
FIG. 6 is an exemplary flowchart depicting a portion of an item selection routine.

In accordance with the disclosed and claimed concept, an exemplary flowchart depicting certain portions of the item selection routine 1033 is shown in FIG. 6. To select a new item, the processor 1031 initializes the item selection routine 1033, and clears "Occupied Item" log data (step S1). The processor 1031 then assigns a predetermined item as a temporary selected item (step S2) and inserts the data of the temporary selected item into the "Occupied Item" log (step S3). If the temporary selected item is a desired item (step S4) the processor 1031 assigns the temporary selected item as a final selected item (step S13); otherwise, it waits for a standard pointer input (step S5).

When processor 1031 receives a new gesture navigation input, the processor 1031 converts the gesture navigation input into a standard pointer input. If the plurality of items has one or more unoccupied items along the pointer direction (step S6Y), the processor 1031 will continue to select an item based on the type of the input standard pointer (step S7); otherwise, the processor 1031 will wait for the user to provide a new gesture navigation input, to restart the item selection process, or to end the item selection process (step S14).

If the plurality of items has one or more unoccupied items along the pointer direction and the type of the input standard pointer is diagonal (condition A), the processor 1031 then determines if it has one or more occupied items along the pointer direction (step S7A). If yes, following the input standard pointer direction, the processor 1031 assigns the furthest unoccupied item that is located between, but not including the temporary selected item and the nearest occupied item as temporary selected item (step S8Y). If no, following the input standard pointer direction, the processor 1031 assigns the furthest unoccupied item as temporary selected item (step S8N).

If the plurality of items has one or more unoccupied items along the pointer direction and the type of the input standard pointer is vertical (condition B), the processor 1031 then determines if any rows have occupied items along the input standard pointer direction (step S7B). If yes, on the same column, following the input standard pointer direction, the processor 1031 assigns the furthest unoccupied item that is located between, but not including the temporary selected item and the nearest row that has an occupied item as a temporary selected item (step S9Y). If no, on the same column, following the input standard pointer direction, the processor 1031 assigns the furthest unoccupied item as a temporary selected item (step S9N).

If the plurality of items has one or more unoccupied items along the pointer direction and the type of the input standard pointer is horizontal (condition C), the processor 1031 then determines if any columns have occupied items along the input standard pointer direction (step S7C). If yes, on the same row, following the input standard pointer direction, the processor 1031 assigns the furthest unoccupied item that is located between, but not including the temporary selected item and the nearest column that has an occupied item as a temporary selected item (step S10Y). If no, on the same column, following the input standard pointer direction, the processor 1031 assigns the furthest unoccupied item as a temporary selected item (step S10N).

Once the new item is assigned as a temporary selected item, the processor 1031 inserts the data of the temporary selected item into the "Occupied Item" log (step S11). If the new item is a desired item (step S12), the processor 1031 assigns the temporary selected item as the final selected item (step S13); otherwise, the processor 1031 waits for user to provide a new gesture navigation input, i.e., pointer input (step S5).

Figure 7A:
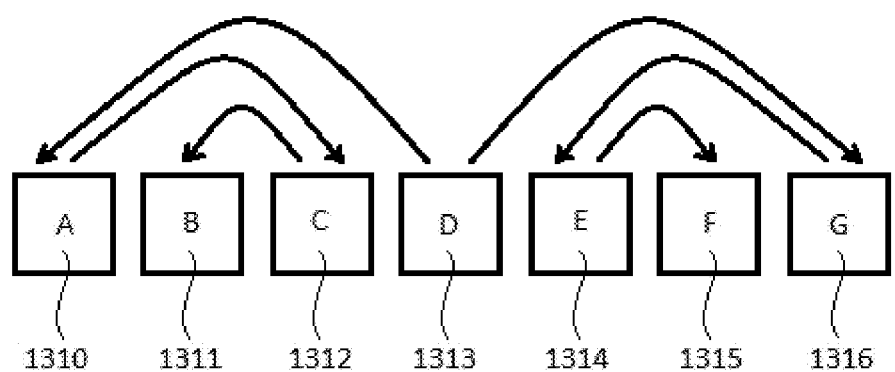
FIG. 7A depicts exemplary traverse paths for selecting an item from a plurality of items where the items are arranged horizontally.

An exemplary traverse path for selecting an item from a plurality of items where the items are arranged horizontally is depicted in FIG. 7A. To select a new item, for example and without limitation, a user can tap a sensing region to initialize the item selection routine 1033. Next, the processor 1031 assigns an item as a predetermined item. In this case, item "D" 1313 is assigned as the predetermined item and the temporary selected item (step S2). If item "D" 1313 is a desired item, user can select this item as the final selected item (step S13).

If item "D" 1313 is not the desired item, and the user points to the left direction, item "A" 1310 is assigned as the temporary selected item (step S10N); then, if the user continues to point to the right direction, item "C" 1312 is assigned as the temporary selected item (step S10Y); then, if the user continues to point to the left direction again, item "B" 1311 is assigned as the temporary selected item (step S10Y).

Similarly, if item "D" 1313 is not the desired item, and the user points to the right direction, item "G" 1316 is assigned as the temporary selected item (step S10N); then, if the user continues to point to the left direction, item "E" 1314 is assigned as the temporary selected item (step S10Y); then, if the user continues to point to the right direction again, item "F" 1315 is assigned as the temporary selected item (step S10Y).

Figure 7B:
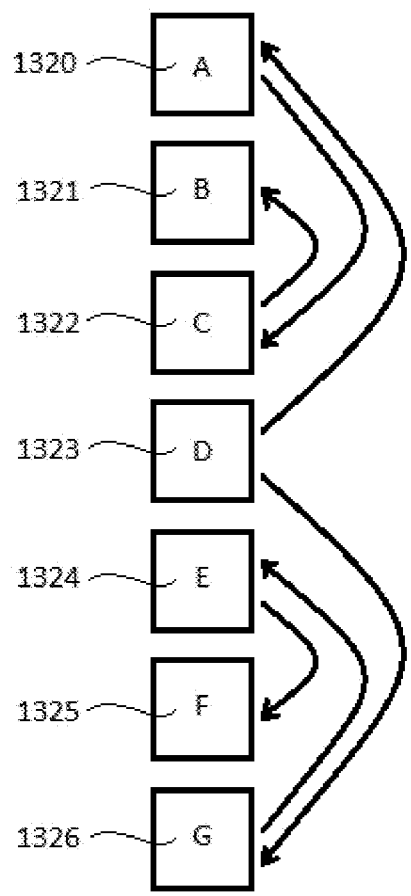
FIG. 7B depicts exemplary traverse paths for selecting an item from a plurality of items where the items are arranged vertically.

Another exemplary traverse paths for selecting an item from a plurality of items where the items are arranged vertically is depicted in FIG. 7B. In this case, item "D" 1323 is assigned as a predetermined item and temporary selected item (step S2). If item "D" 1323 is not the desired item, and the user points in the upward direction, item "A" 1320 is assigned as the temporary selected item (step S9N); then, if the user continues to point to the downward direction, item "C" 1322 is assigned as the temporary selected item (step S9Y); then, if the user continues to point in the upward direction again, item "B" 1321 is assigned as the temporary selected item (step S9Y).

Similarly, if item "D" 1323 is not the desired item, and the user points to the downward direction, item "G" 1326 is assigned as the temporary selected item (step S9N); then, if the user continues to point in the upward direction, item "E" 1324 is assigned as the temporary selected item (step S9Y); then, if the user continues to point to downward direction again, item "F" 1325 is assigned as the temporary selected item (step S9Y).

Figure 7C:
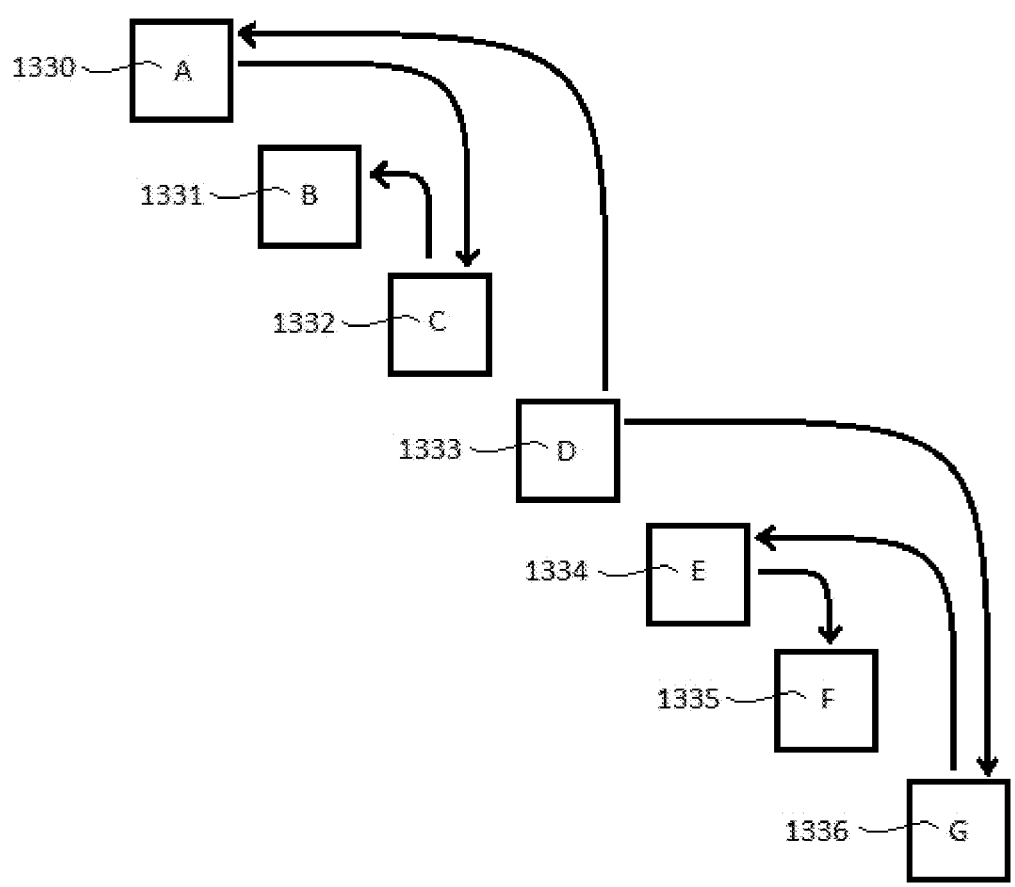
FIG. 7C depicts exemplary traverse paths for selecting an item from a plurality of items where the items are arranged diagonally.

Another exemplary of traverse paths for selecting an item from a plurality of items where the items are arranged diagonally is depicted in FIG. 7C. In this case, item "D" 1333 is assigned as a predetermined item and temporary selected item. If item "D" 1333 is not the desired item, and the user points to a diagonally outward direction with respect to item "D" 1333, item "A" 1330 is assigned as the temporary selected item (step S8N); then, if the user continues to point to the opposite diagonal direction, item "C" 1332 is assigned as the temporary selected item (step S8Y); then, if the user continues to point to the same diagonally outward direction again, item "B" 1331 is assigned as the temporary selected item (step S8Y).

Similarly, if item "D" 1333 is not the desired item, and the user points to another diagonally outward direction with respect to item "D" 1333, item "G" 1336 is assigned as the temporary selected item (step S8N); then, if the user continues to point to the opposite diagonal direction, item "E" 1334 is assigned as the temporary selected item (step S8Y); then, if the user continues to point to the same diagonally outward direction again, item "F" 1335 is assigned as the temporary selected item (step S8Y).

Figure 8:
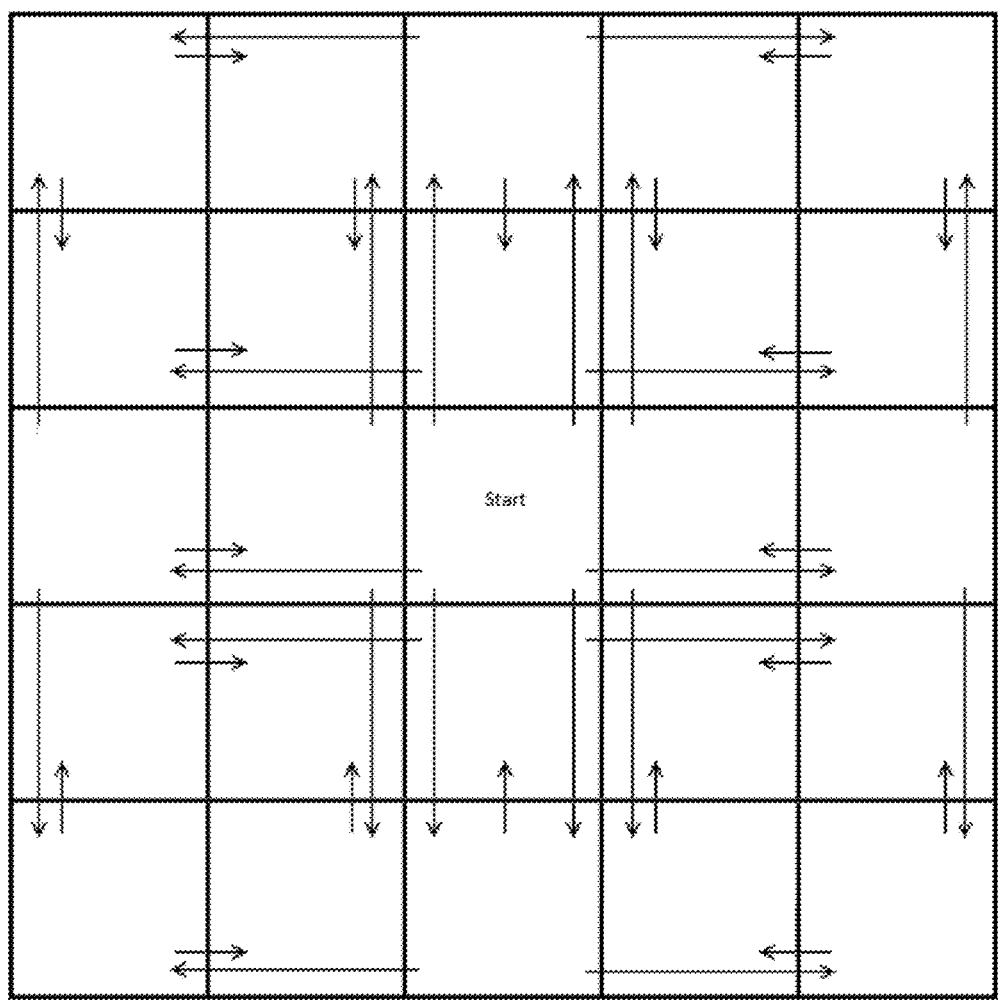
FIG. 8 depicts exemplary traverse path for selecting an item from a plurality of items where the items are arranged in two-dimensional array.

FIG. 8 depicts an exemplary traverse path for selecting an item from a plurality of items where the items are arranged in two-dimensional array. An example of the operation of selecting an item in the two-dimensional array is depicted in FIG. 9. To select a new item, for example and without limitation, a user finger 1401 taps a sensing region 1450 to initialize the item selection routine 1033. Next, the processor 1031 assigns an item as a predetermined item. In this case, item "d" 1411 is the predetermined item and assigned as temporary selected item (step S2). An indicator 1455 highlights item "d" 1411 as the temporary selected item. The content of a cursor 1453 also indicates the temporary selected item; in this case, the content is "d".

If item "d" 1411 is not the desired item, and the user finger 1401 points to the left direction, item "a" 1412 is assigned as the temporary selected item (step S10N); then, if the user finger 1401 continues to point to the upward direction, item "q" 1413 is assigned as the temporary selected item (step S9N); then, if the user finger 1401 continues to point to the right direction, item "w" 1414 is assigned as the temporary selected item (step S10Y); then, if the user finger 1401 continues to point to the downward direction, item "2" 1415 is assigned as the temporary selected item (step S9Y).

It thus can be seen that the processor 1031 first converts gesture navigation input into a set of standard pointers, as long as the magnitude of the gesture navigation movement is greater than a predetermined threshold, the actual magnitude does not affect the item selection. Since the standard pointer is magnitude independent and the item selection routine does not depend on the magnitude of the gesture navigation movement, accuracy of the item selection is greatly enhanced. For example and without limitation, if a plurality of items represents a plurality of characters, user can use the item selection method as a keyboard for entering data. By memorizing the traverse paths, user can select a desired item without looking at the display. For example and without limitation, if the gesture input device has key sensors and those key sensors have a raised contact surface, visually impaired users can also use this device for entering data. Furthermore, the use of this pointer input and item selection routine 1033 limits the path of traverse cycle within a confined sensing region 1012, thus the size of input apparatus 1010 can be much smaller.

While specific embodiments of the disclosed and claimed concept relates generally to electronic device and gesture input method of item selection have been described in detail, it will be appreciated by those skilled in the art that various modifications and alternatives to these details could be developed. Accordingly, the particular arrangements disclosed are meant to be illustrative only and not limiting as to the scope of the disclosed and claimed concept which is to be given the full breadth of the claims appended and any and all equivalents thereof.

I claim:

1. A method for a system that selects a desired item from a plurality of items based on gesture navigation inputs, comprising:
   displaying on a display of an electronic device an array of a plurality of items;
   assigning a predetermined item from said plurality of items as a temporary selected item;
   storing data of said temporary selected item in a history log of occupied items;
   if the temporary selected item is the desired item, assign the temporary selected item as the desired item;
   if the temporary selected item is not the desired item, generating a first gesture navigation input;
   converting said gesture navigation input to a standard pointer indicating the direction of navigation;
   in the direction of said standard pointer, select the furthest unoccupied item, without selecting intermediary unoccupied items, from said plurality of items, assign said item as a second temporary selected item and store data of said second temporary selected item in said history log;
   if said second temporary selected item is a desired item, assign it as the desired item;
   if said second temporary selected item is not the desired item, generate a second gesture navigation input that converts to a new standard pointer that is not in the direction of said previous standard pointer;
   in the direction of said new standard pointer, select the next furthest unoccupied item, without selecting intermediary unoccupied items, from said plurality of items, assign said item as a third temporary selected item and store data of said new third temporary selected item in said history log;
   repeat generating a new gesture navigation input until a desired item is selected.

2. The method of claim 1 wherein said plurality of items are arranged in one-dimension.

3. The method of claim 1 wherein said plurality of items are arranged in two-dimensional array.

4. An apparatus for selecting a desired item from a plurality of items based on gesture navigation inputs, comprises:
   a display for displaying a temporary selected item within an array of a plurality of items;
   a memory for storing data of said temporary selected item in a history log of occupied items;
   a sensor means for receiving gesture navigation inputs; and
   a controller, which will:
   assign a predetermined item from said plurality of items as a temporary selected item;
   store data of said temporary selected item in a history loci of occupied items;
   if the temporary selected item is the desired item, assign the temporary selected item as the desired item;
   if the temporary selected item is not the desired item, generate a first gesture navigation input;
   convert said gesture navigation input to a standard pointer indicating the direction of navigation;
   in the direction of said standard pointer, select the furthest unoccupied item, without selecting intermediary unoccupied items, from said plurality of items, assign said item as a second temporary selected item and store data of said second temporary selected item in said history log;
   if said second temporary selected item is a desired item, assign it as the desired item;
   if said second temporary selected item is not the desired item, wait for a second gesture navigation input that converts to a new standard pointer that is not in the direction of said previous standard pointer;
   in the new direction of said new standard pointer, select the next furthest unoccupied item, without selecting intermediary unoccupied items, from said plurality of items, assign said item as a third temporary selected item and store data of said new third temporary selected item in said history log;
   repeat generating a new gesture navigation input until a desired item is selected.

5. The apparatus of claim 4 further including one or more tactile sensors that has a raised contact surface.

6. The apparatus of claim 4 further including one or more optical sensors that has a raised contact surface.

* * * * *